July 22, 1958  A. H. MACISZEWSKI ET AL  2,844,727
APPARATUS FOR TREATING WATER
Filed Sept. 25, 1953  2 Sheets-Sheet 1
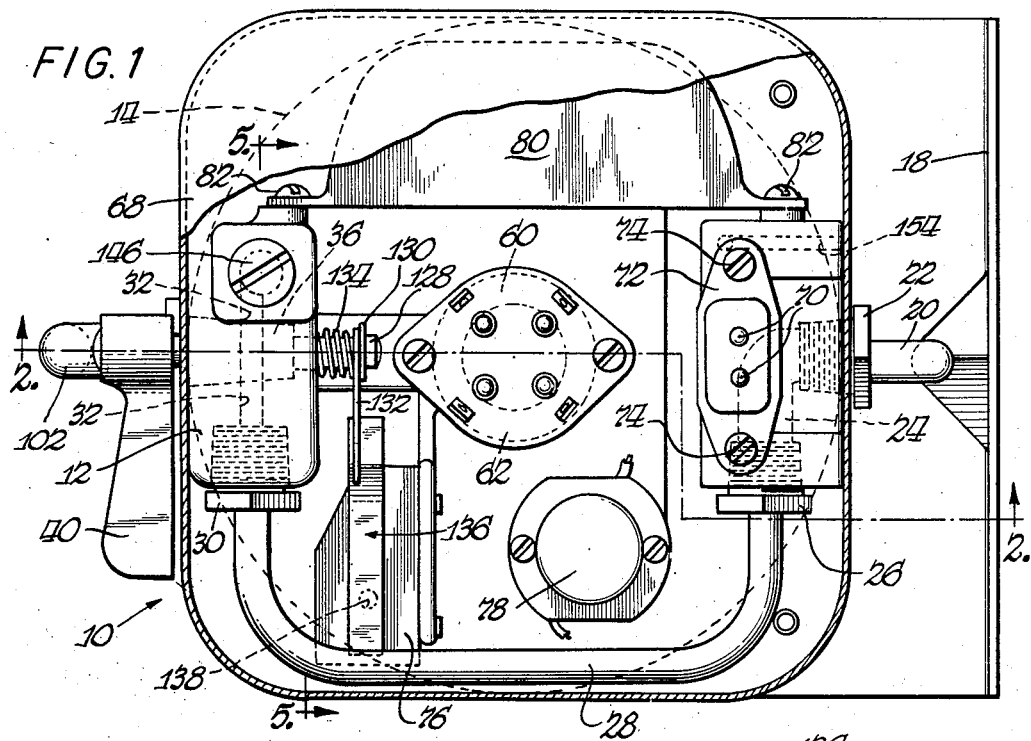
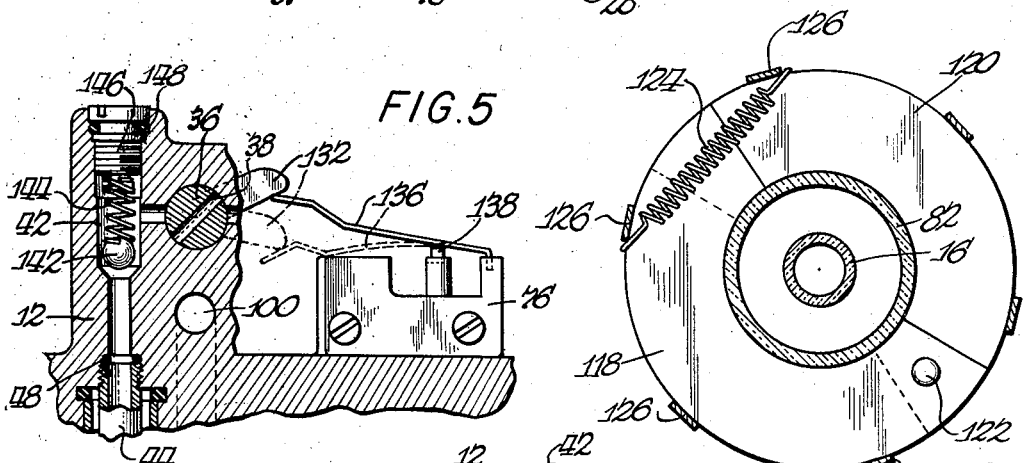
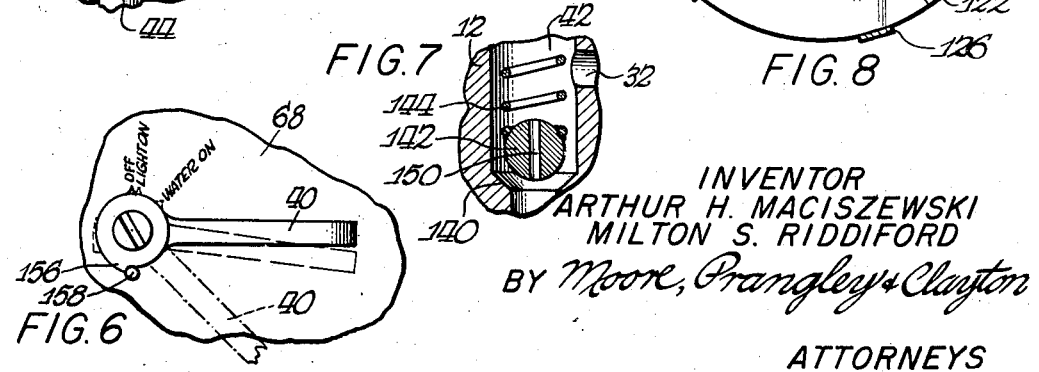
INVENTOR
ARTHUR H. MACISZEWSKI
MILTON S. RIDDIFORD
BY Moore, Prangley & Clayton
ATTORNEYS

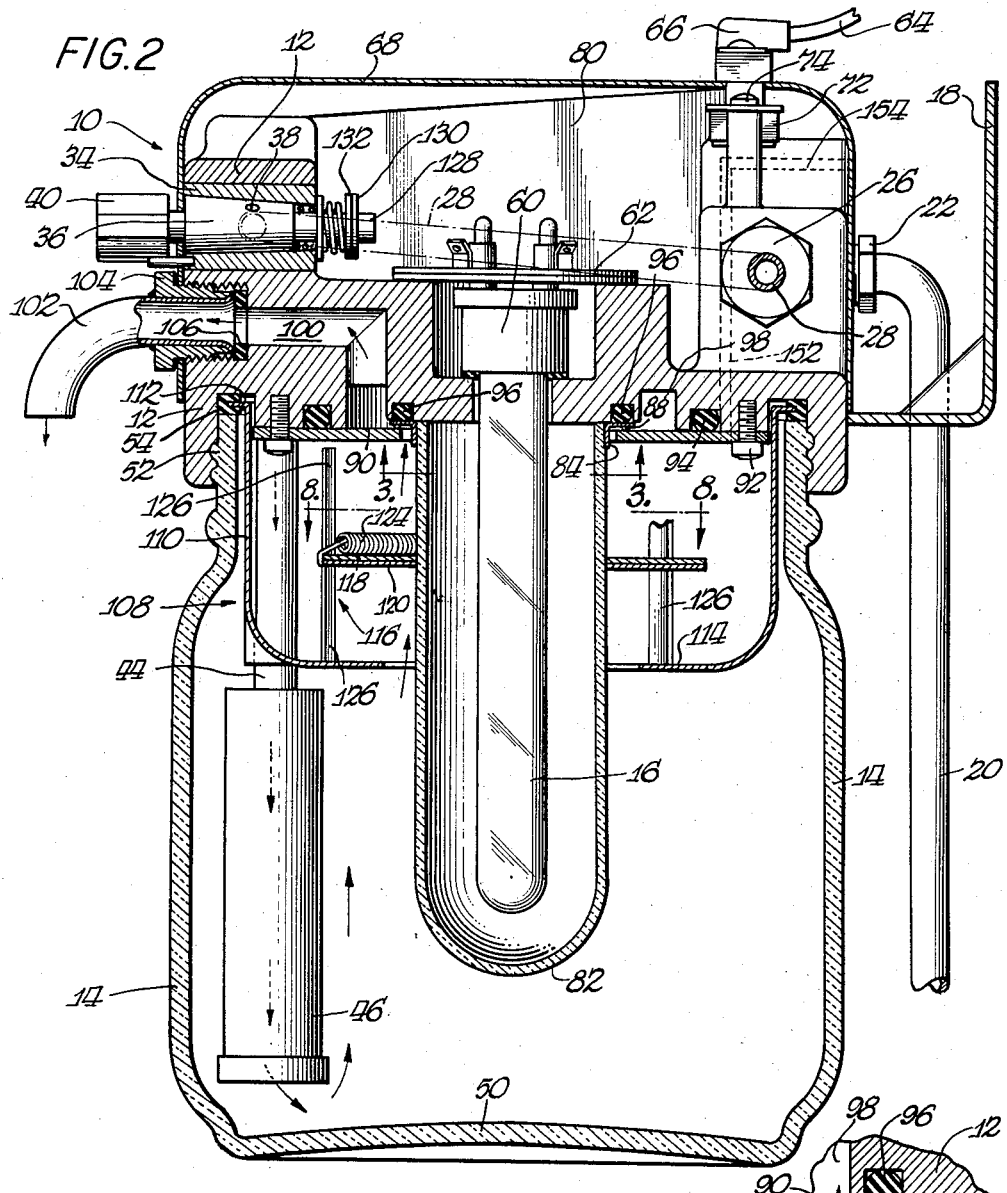

United States Patent Office 2,844,727
Patented July 22, 1958

2,844,727

APPARATUS FOR TREATING WATER

Arthur H. Maciszewski and Milton S. Riddiford, River Forest, Ill., assignors to A. R. F. Products, Inc., River Forest, Ill., a corporation of Illinois Application September 25, 1953, Serial No. 382,398

21 Claims. (Cl. 250—43)

This invention relates to apparatus for the purification and germicidal treatment of fluids and particularly to apparatus for purification and germicidal disinfection of water for human consumption.

The apparatus of the present invention includes a source of suitable germicidal radiation such as an ultra-violet light which is surrounded by a transparent casing made of glass or other light transmitting material which is preferably substantially opaque to ultra-violet radiation. The water or other fluid to be treated is circulated within the casing and around the ultra-violet light. After a suitable period of exposure to the ultra-violet radiation, the water is conducted to an outlet spout.

In certain types of apparatus used heretofore the radiation source becomes coated with materials that are present in the water and which collect thereon thereby rendering transmission of the ultra-violet light less efficient. This prohibits satisfactory treatment of the water. Since the outer casing is made of glass or some other material which generally has a relatively low structural strength, it is preferred to provide safety devices to prevent the pressure within the casing from building up to an unsafe value.

As explained in the preceding paragraph, the pressure within the outer casing must be maintained below a predetermined maximum and the best way to do this is to control the amount and rate of water introduced into the casing at the input to the casing rather than at the outlet from the casing. Psychologically however, users prefer to have the illusion of controlling the flow of water at the output and accordingly control of the flow adjacent the output spout is preferred.

Therefore, it is an important object of this present invention to provide a structure of the type set forth in which the water passages and the radiation transmitting surfaces are readily accessible for cleaning and servicing.

Another object of the invention is to provide an improved baffle structure which insures that the water to be treated is subjected to germicidal radiation for a sufficient length of time, the baffle structure being readily accessible for cleaning and servicing on all portions thereof.

Yet, another object of this invention is to provide a water treating apparatus of the type set forth in which a manual flow control is provided that controls the input to the apparatus but is positioned physically adjacent the outlet spout of the apparatus so that a user has the illusion of controlling the output directly.

Still another object of this invention is to provide an apparatus of the type described in which the germicidal radiation must be turned on before the water or other fluid to be treated begins to flow about the source of radiation for treatment.

Yet another object of this invention is to provide in apparatus of the type described including a readily breakable outer casing automatic means for limiting the pressure and the rate of flow of fluid within the breakable casing.

In connection with the foregoing objects it is a further object of the invention to provide safety means for relieving excess pressure within the breakable casing.

A further object of the invention is to provide in apparatus of the type described means to insure that any parts carrying dangerous electrical potentials are covered and protected when the dangerous electrical potentials are applied thereto.

These and other objects and advantages of the invention will be more apparent from the following description when taken in conjunction with the accompanying drawings. In the drawings, wherein like reference numerals have been used to indicate like parts throughout:

Fig. 1 is a plan view with portions of the top broken away of a water treating apparatus embodying the principles of the present invention;

Fig. 2 is a view in vertical section of the apparatus shown in Fig. 1 substantially as seen in the direction of the arrows along the line 2—2 of Fig. 1;

Fig. 3 is a partial cross sectional view with parts broken away substantially as seen in the direction of the arrows along the line 3—3 of Fig. 2;

Fig. 4 is an enlarged partial cross sectional view showing the outlet from the irradiating chamber;

Fig. 5 is a partial view in vertical section with certain parts broken away substantially as seen in the direction of the arrows along the line 5—5 of Fig. 1;

Fig. 6 is a fragmentary view of the various positions of the control handle;

Fig. 7 is a fragmentary view in vertical section showing the automatic flow control valve at the inlet to the irradiating chamber; and Fig. 8 is a partial cross sectional view substantially as seen in the direction of the arrows along the line 8—8 of Fig. 2.

Referring now to the drawings and more particularly to Figs. 1 and 2 thereof, there is shown a water purification apparatus embodying the principles of the present invention and generally designated by the numeral 10. To simplify the following description, the apparatus will be described as used in the purification and germicidal treatment of water but it is understood that the apparatus is useful in treating other fluids as well.

Water purifier 10 comprises generally a base 12 on which is mounted the remaining portions of the apparatus including a casing 14 and a source of germicidal radiation such as ultra-violet light 16. In use the base 12 is provided with a mounting bracket 18 which is used in mounting the apparatus on a suitable support wall. Water is supplied to the purification apparatus 10 through an inlet pipe 20 which is connected to a source of water not shown. Pipe 20 terminates in a coupling 22 which screws into an aperture in base 12. Connecting with pipe 20 and positioned within base 12 is an L-shaped passage 24 (see Fig. 1) which is fitted at its other end with another coupling 26. Attached to coupling 26 is a section of pipe 28 which has on its other end another coupling 30. Coupling 30 screws into another aperture in base 12 that connects with a passage 32.

Passage 32 is interrupted adjacent its mid-point by an enlarged aperture extending transversely therewith and disposed substantially horizontally when the apparatus is in operative position. Fitted within this aperture is a sleeve 34 (see Fig. 2) which has aligned apertures communicating with the interrupted aperture of passage 32. Mounted within sleeve 34 is a valve member 36 having an aperture 38 formed therein. The interior of sleeve 34 and the exterior of valve 36 are tapered and fit to form a valve. When valve member 36 is arranged so that aperture 38 is disposed substantially horizontal, aperture 38 serves to connect the interrupted sections of passage 32 thereby permitting water to flow through passage 32.

Attached to valve member 36 is a handle 40 which serves to operate the valve member 36.

The other end of passage 32 connects with a vertically disposed passage 42 (see Fig. 5) formed in base 12 and extending vertically therein. The lower end of passage 42 is threaded and threadedly receives a pipe 44 to the lower end of which is attached filter 46 (see Fig. 2). There is provided between pipe 44 and casing 12 an O-ring 48 to provide a fluid tight seal between these members. The filter 46 discharges into a water chamber formed by casing 14 and base 12.

Casing 14 is circular in cross section, being closed at one end by a wall 50 and provided at the other end with screw threads 52. Base 12 has an aperture on the lower face thereof and is provided with screw threads therein which receive and cooperate with the screw threads 52 on casing 14. A gasket 54 is disposed between the upper edge of casing 14 and base 12 to form a fluid tight seal.

Radiation to provide the germicidal action is provided by lamp 16. The base 60 of lamp 16 is received in a prong socket 62 to which are attached suitable electrical connections (not shown). More specifically, power for lamp 16 is provided from a cord 64 which is attached to a receptacle 66. Receptacle 66 is mounted on and extends through a cover 68 which is provided to protect the electrical connections on socket 62 and other connections to be described hereafter and to prevent these connections from being contacted by a user when the power is turned on.

Receptacle 66 receives a pair of prongs 70 that are mounted on a plug 72 which is in turn held on base 12 by screws 74. Suitable connections are made from plug 72 to the control switch 76 and starter 78. Connections are then made from starter switch 78 and control switch 76 to socket 62. There is also provided a ballast 80 mounted on base 12 by screws 82 and suitably wired to the other electrical components. Switches 76 and 78 and ballast 80 serve to start and operate lamp 16 when power is applied to plug 72.

Referring particularly to Fig. 2 of the drawings it will be seen that the lamp 16 is mounted substantially in the center of casing 14 and extends a substantial portion of the length thereof. Surrounding lamp 16 is an enclosure 82 which is substantially cylindrical in shape and is closed on the bottom end. Enclosure 82 is made of an ultra-violet radiation transmitting material such as a special glass, quartz, suitable plastic or other material which will transmit radiation in the germacidal range such as in the ultra-violet range. The upper end of the enclosure 82 is cemented to a collar 84 to provide a liquid tight connection therebetween. The upper edge of collar 84 has an outwardly extending flange 86 extending therearound. Formed on flange 86 at regular intervals and extending downwardly therefrom in operative position is a plurality of depressions or dimples 88 which perform a function to be described hereafter.

The lamp enclosure 82 is held in assembled relationship on base 12 by means of a circular and apertured plate 90, plate 90 having an external diameter slightly less than the diameter of the upper end of casing 14 and an aperture in the center thereof that is slightly greater in diameter than the diameter of sleeve 84. Plate 90 is held against base 12 by a plurality of bolts 92 and in turn bears against the dimples 88 to hold sleeve 84 and lamp enclosure 82 against base 12. A pair of concentric grooves are formed on the bottom surface of base 12 and receive circular O-rings 94 and 96. O-ring 94 serves to seal the joint between base 12 and plate 90 and O-ring 96 seals the juncture between base 12 and lamp enclosure 82.

The dimples 88 on flange 86 space plate 90 away from flange 86 to provide openings therebetween. These openings constitute the discharge or outlet port for casing 14 and empty in to a circular channel 98 which is substantially square in cross section as is best seen in Figure 2.

Since the dimples are substantially equally spaced and since enclosure 82 is centrally located with respect to the aperture in plate 90, the flow of water from casing 14 into channel 98 is evenly distributed around the circumference of enclosure 82. Communicating with channel 98 is an outlet passage 100 formed in base 12. Passage 100 communicates with a spout 102 that is held on base 12 by a threaded coupling 104. Fluid tight sealing is provided between spout 102 and base 12 by a washer 106.

In order to insure that all portions of water flowing through casing 14 receive an adequate amount of germicidal radiation, a baffle generally designated by numeral 108 is provided. Baffle 108 has a cylindrical section 110 on the upper edge of which is formed an out-turned flange 112. Flange 112 is received in a groove formed in the gasket 54 and is therefore held in mounted position by casing 14 through the agency of gasket 54. The lower end of the baffle carries an inturned and horizontally disposed baffle section 114 that extends inwardly and surrounds the enclosure 82. The inner edge of baffle portion 114 is spaced away from lamp enclosure 82 a distance such that turbulent flow conditions are maintained at this point. This insures a good mixing of all water being treated and subjects all of the water to radiation intensive enough to kill the harmful organisms therein. There is also provided in baffle portion 114 an aperture through which passes pipe 48.

Positioned on baffle 108 and supported thereby is an assembly clamp generally designated by the numeral 116. Clamp 116 serves to steady and support the lamp enclosure 82 during operation. The structure of clamp 116 is best understood by referring to Figs. 2 and 8 of the drawings. In Fig. 8 it will be seen that the clamp includes two clamp sections 118 and 120 which are pivoted together by a rivet 122 to provide a hinge action. Sections 118 and 120 are slightly more than semi-circular in shape and when assembled form a circular plate. In the center of the assembled sections is an aperture having a diameter that is substantially the same as the diameter of lamp enclosure 82. A spring 124 interconnects the clamp sections 118 and 120 and urges the sections together to clamp lamp enclosure 82 therebetween. Arranged around the outer periphery of the clamp sections 118 and 120 are legs 126 which hold the assembly clamp 116 in operative position on baffle 108.

Referring now particularly to Figs. 1, 5 and 6, the manner in which the germicidal lamp 16 is turned on and the manner in which flow through casing 14 is obtained will be described. The valve member 36 has formed on the inner end thereof a shaft 128 on which is fixed a washer 130. Mounted on shaft 128 is a lever arm 132 which is held in a biased position by a spring 134 disposed between arm 132 and the portion of base 12 surrounding shaft 128. Arm 132 extends perpendicular to shaft 128 and contacts the actuating arm 136 of switch 76. Switch 76 is preferably a micro-switch having a movable contact actuated by a member 138 which in turn is moved by the arm 136. Thus when handle 40 is turned clockwise as viewed in Fig. 6, arm 136 is moved downwardly and thereby closes control switch 76. This starts lamp 16 and places the apparatus in condition to begin operation.

From Figs. 5 and 6 it will be seen that a slight movement of handle 40 in a clockwise direction will turn on lamp 60 and that a substantial further movement in a clockwise direction will place passage 38 in alignment with passage 32 and thereby permit flow of water from pipe 20 to the filter 46 by the path that has been described above.

It is desirable to limit the pressure of water within casing 14 and to limit the rate of flow of water through casing 14 and past the germicidal lamp 16. The degree of kill of organisms in the water is dependent upon the length of time that the water and organisms are exposed to the radiation and upon the strength of the radiation to which they are exposed. The strength of radiation from lamp 16 is substantially constant and is controlled by the type of lamp and by the size of the aperture in baffle portion 114.

Accordingly the degree of kill is in effect controlled by the rate of flow of the water between baffle 114 and lamp enclosure 82. For this reason there is provided means to limit the flow of water through casing 14 in the form of valve best illustrated in Figs. 5 and 7. The valve is positioned in passage 42 and includes a valve seat 140 and a ball 142. Ball 142 is normally held spaced away from seat 140 by means of a spring 144. One end of spring 144 is welded or otherwise attached to ball 142 and the other end is attached to a plug 146. Plug 146 is threadedly engaged in the upper end of passage 142 and is provided with a sealing ring 148. The distance that ball 142 is spaced above seat 140 can be adjusted by moving plug 146 up and down.

The rate of flow of water past ball 142 is dependent upon the relationship between the diameter of the ball, the diameter of passage 42, the tension of spring 144 and the initial spacing between ball 142 and seat 140. As the pressure of water in passage 42 above ball 142 increases, ball 142 is forced downwardly against the tension of spring 144 and tends to close seat 140 thereby decreasing the flow of water into filter pipe 44. If ball 142 is moved upwardly away from seat 140, the maximum rate of flow is increased and if ball 142 is lowered toward seat 140 the maximum rate of flow is decreased.

When the adjusted maximum rate of flow is obtained, ball 142 will be either near or seated on seat 140. Fluctuations in pressure from the incoming water would cause ball 142 to chatter on seat 140. To prevent chattering, an aperture 150 is provided in ball 142 (see Fig. 7). Aperture 150 permits a predetermined minimum amount of water to flow through passage 42 into the filter pipe 44.

Since casing 14 may be made of glass or other readily and easily breakable material, means is provided to relieve pressure on casing 14 in the event that the outlet passages or outlet spout become clogged or in the event that pressure within casing 14 becomes excessive for any other reason. To this end an aperture 152 is provided in plate 90 which connects with a venting passage 154 formed in base 12. The outlet for venting passage 154 terminates adjacent another aperture in cover 68 through which excess water can flow to atmosphere. This arrangement provides means for relieving the pressure on casing 14 at all times.

A description of the operation of the apparatus will now be given. The handle 40 is turned to the off position as shown in Fig. 6 in which position a projection 156 abuts against a stop pin 158; next the cover 68 is placed in the position shown in Fig. 2 in the event it has been removed. Handle 40 is then turned a small distance clockwise thereby closing switch 76 and energizing the germicidal lamp 16. At this point there is no flow of water through casing 14 and out of spout 102.

Upon further turning of handle 40 to the lowermost position shown in Fig. 6 flow of water through casing 14 is established. More particularly water flows from pipe 20 through passage 24 and pipe 28 to passage 32. With handle 40 in the lowermost position passage 38 in valve member 36 is aligned with passage 32 and permits flow of water therethrough. The water then flows down past ball 142 and into filter 46. The water is filtered through the filter 46 and gently mixes with the remaining water in casing 14 upon leaving filter 46.

At this time the water is first exposed to the radiation from the germicidal lamp 16. The water then flows upwardly around enclosure 82 and through the opening between baffle portion 114 and enclosure 82. This opening causes turbulent flow of the water so that good mixing is obtained. The water then flows upwardly into the outlet channels formed between plate 90 and sleeve 84 as is shown by the arrows in Fig. 4. This latter channel distributes the water and feeds it into the collection channel 98. From channel 98 the purified water enters passage 100 and flows from spout 102.

If pressure in pipe 20 is high enough to exceed the predetermined rate of water past ball 142, ball 142 will move downwardly to block partially the passage past seat 140 thereby limiting the rate of flow into casing 14.

If the pressure within casing 14 rises to a predetermined value, water will be discharged through the venting passage 154 thereby relieving pressure within casing 14.

It will be seen that there has been provided an improved water purifying apparatus which fulfills all of the objects and advantages set forth in the above. More specifically the various parts of the apparatus which come in contact with the water being treated are readily accessible by the removal of a minimum number of parts. By keeping the radiation transmitting surfaces clean the degree of kill obtained on the organisms in the water is maintained at a high level.

The improved baffle structure provides turbulent flow of the water being treated adjacent the germicidal lamp and insures that all portions of water passing through the purifier receive an adequate amount of radiation to obtain the desired degree of kill. The outlet passages also maintain turbulent flow thereby aiding in the proper distribution and mixing of the treated water.

The manual flow control in the form of handle 40 is positioned adjacent the outlet spout 102 so that the user has an illusion of controlling the flow of water at the outlet but actually the handle controls the inlet stream to the water purifier. The multiple positions of handle 40 in cooperation with arm 102 and switch 76 insure that the germicidal lamp 16 is operative before a new supply of water is admitted to casing 14.

Means has also been provided to limit the maximum rate of flow of water into the purifier in the form of ball 142 thereby insuring that the water is exposed for a sufficient time to the germicidal radiation, this control of flow of water being automatic and being adjustable as to the desired maximum rate of flow. Quiet operation of the automatic flow control is insured by providing passage 150 through ball 142.

Important safety features have been provided in the purifier in the form of the venting passage 154 and the interlock on the cover so that power from line 64 is not applied to the exposed connections on lamp 16 if the protective cover 68 is removed. Venting passage 154 provides means for removing pressure immediately from casing 14 if the pressure rises above a predetermined minimum value by permitting the water therein to escape to the atmosphere. Cover 68 when in operative position protects the user from the exposed electrical connections at the base of lamp 16. If cover 68 is removed, then the potential applied through line 64 is also removed thereby removing electrical potentials from the base of lamp 16.

Although a preferred embodiment of the invention has been shown for purposes of illustration it is to be understood that various changes and modifications can be made therein without departing from the spirit and scope of the invention. Accordingly the invention should be limited only as set forth in the following claims.

We claim:

1. A water treating apparatus comprising a base, a source of germicidal disinfecting radiation mounted on said base, a casing mounted on said base, and readily removable therefrom said casing being positioned concentric with respect to said source of radiation and forming a closed chamber in cooperation with said base, an inlet and an outlet for said chamber, and a baffle mounted on said base and disposed concentric with respect to said source of radiation, said baffle including a cylindrical portion extending into said chamber and an inturned flange formed on the end of said cylindrical portion extending into said chamber, said flange being directed toward said source of radiation and spaced a short distance therefrom to divide said chamber into two sections.

2. A water treating apparatus comprising a base, a source of germicidal disinfecting radiation mounted on said base, a casing mounted on said base, and readily removable therefrom said casing being position concentric with respect to said source of radiation and forming a closed chamber in cooperation with said base, a baffle mounted on said base and disposed concentric with respect to said source of radiation, said baffle including a cylindrical portion extending into said chamber and an inturned flange formed on the end of said cylindrical portion extending into said chamber, said flange being directed toward said source of radiation and spaced a short distance therefrom to divide said chamber into two sections, an inlet for said chamber on one side of said baffle, and an outlet for said chamber on the other side of said baffle to cause water to flow from said inlet through the opening between said baffle and said source of radiation and then to said outlet.

3. A water treating apparatus comprising a base, a source of germicidal disinfecting radiation mounted on said base, a cylindrical casing removably mounted on said base and depending downwardly therefrom, the lower end of said cylindrical casing being closed to form a closed chamber in cooperation with said base, said cylindrical casing being positioned concentric with respect to said source of radiation, a baffle mounted on said base and including a cylindrical portion having a diameter less than the diameter of said cylindrical casing and extending in the same direction and concentric with said casing, an inturned flange formed on the end of said cylindrical baffle portion disposed away from said base, said flange extending inwardly toward said source of radiation and surrounding and spaced a short distance therefrom to divide said chamber into two sections, an inlet and an outlet in said base for said chamber, and a conduit extending from one of said inlet and said outlet through said baffle.

4. A water treating apparatus comprising a base, a source of germicidal disinfecting radiation mounted on said base, a casing mounted on said base, and readily removable therefrom said casing being positioned concentric with respect to said source of radiation and forming a closed chamber in cooperation with said base, an inlet and an outlet for said chamber, a baffle mounted on said base and being disposed concentric with respect to said source of radiation, said baffle including a cylindrical portion extending into said chamber and an inturned flange formed on the end of said cylindrical portion and extending into said chamber and directed toward said source of radiation, and a clamp mounted on said inturned flange and surrounding and supporting said source of radiation.

5. A water treating apparatus comprising a base, a germicidal lamp mounted on said base, a germicidal radiation transmitting enclosure mounted on said base and surrounding said lamp, a casing removably mounted on said base, said casing being positioned concentric with respect to said source of radiation and forming a closed chamber in cooperation with said base, an inlet and an outlet for said chamber, a baffle mounted on said base and disposed concentric with respect to said source of radiation, said baffle including a cylindrical portion extending into said chamber and an inturned flange formed on the end of said cylindrical portion extending into said chamber, said flange being directed toward said source of radiation and spaced a short distance therefrom to divide said chamber into two sections, a clamp mounted on said inturned flange and including two clamp sections pivotally connected and encircling said enclosure, and means biasing said clamp sections toward said enclosure.

6. A water treating apparatus comprising a base, a source of germicidal disinfecting radiation mounted on said base, a casing removably mounted on said base, said casing being positioned concentric with respect to said source of radiation and forming a closed chamber in cooperation with said base, an inlet passage in said base communicating with said chamber, an outlet passage for treated water from said chamber formed on said base, an outlet spout mounted on said base and communicating with said outlet passage, and a valve mounted on said base adjacent said spout and positioned in said inlet passage for controlling the flow of untreated water through said inlet passage into said chamber.

7. A water treating apparatus comprising a base, a source of germicidal disinfecting radiation mounted on said base, a casing removably mounted on said base, said casing being positioned concentric with respect to said source of radiation and forming a closed chamber in cooperation with said base, an inlet passage formed in said base and communicating with said chamber, an outlet passage formed in said base and communicating with said chamber to convey treated water therefrom, an outlet spout mounted on said base and connecting with said outlet passage, and a manually operable valve mounted on said base above said outlet spout and positioned in said inlet passage for controlling the flow of untreated water through said inlet passage.

8. A water treating apparatus comprising a base, a source of germicidal disinfecting radiation mounted on said base including electrical control means therefor, a casing mounted on said base, said casing being positioned concentric with respect to said source of radiation and forming a closed chamber in cooperation with said base, an outlet passage in said base communicating with said chamber, an outlet passage formed in said base and communicating with said chamber for conducting treated water therefrom, an outlet spout mounted on said base and connecting with said outlet passage, a valve mounted on said base adjacent said spout and positioned in said inlet passage for controlling the flow of untreated water through said inlet passage, a handle attached to said valve and controlling said electrical control means, said handle upon initial movement thereof opening said valve and upon further movement operating said electrical control means to energize said source of radiation.

9. A water treating apparatus comprising a base, a source of germicidal disinfecting radiation mounted on said base, a casing mounted on said base, said casing being positioned concentric with respect to said source of radiation and forming a closed chamber in cooperation with said base, an inlet for said chamber, said base having an annular outlet channel formed on the side thereof forming a wall of said chamber, said outlet channel encircling said source of radiation, a plate overlying and covering said channel and encircling said source of radiation, the edge of said plate disposed toward said source of radiation being spaced from said base to form therewith an entrance to said outlet channel, and means to hold said plate in spaced relationship to said base along the edge disposed toward said source of radiation.

10. A water treating apparatus comprising a base, a source of germicidal disinfecting radiation mounted on said base, a casing mounted on said base, said casing being positioned concentric with respect to said source of radiation and forming a closed chamber in cooperation with said base, an inlet for said chamber, an annular outlet channel formed in said base on the side thereof forming a wall of said chamber, said outlet channel encircling said source of radiation, a first plate encircling said source of radiation and disposed inwardly with respect to said outlet channel, a second plate mounted on said base and encircling said source of radiation, the inner edge of said second plate overlying and covering said outlet channel and engaging said first plate to hold said first plate against said base, and projections formed on said first plate at regular intervals therearound and extending toward said second plate to hold said second plate in spaced relationship to said first plate, the spaces between said first and second plates forming an outlet for said chamber connecting with said outlet passage.

11. A water treating apparatus comprising a base, a source of germicidal disinfecting radiation mounted on said base, a casing removably mounted on said base, said casing being positioned concentric with respect to said source of radiation and forming a closed chamber in cooperation with said base, a baffle mounted on said base and disposed concentric with respect to said source of radiation, said baffle including a cylindrical portion extending into said chamber and an inturned flange formed on the end of said cylindrical portion extending into said chamber, said flange being directed toward said source of radiation and spaced a short distance therefrom to divide said chamber into two sections, an inlet for said chamber on the side of said baffle opposite said base, an annular outlet formed in said base and encircling said source of radiation, a plate mounted on said base and encircling said source of radiation, the inner edge of said plate overlying and covering said outlet channel, and means spacing the inner edge of said plate from said base to form an entrance therebetween to said outlet channel.

12. A water treating apparatus comprising a base, a source of germicidal disinfecting radiation mounted on said base, a casing removably mounted on said base, said casing being positioned concentric with respect to said source of radiation and forming a closed chamber in cooperation with said base, a baffle mounted on said base and disposed concentric with respect to said source of radiation, said baffle including a cylindrical portion extending into said chamber and an inturned flange formed on the end of said cylindrical portion extending into said chamber, said flange being directed toward said source of radiation and spaced a short distance therefrom to divide said chamber into two sections, an inlet for said chamber on the side of said baffle adjacent said casing, said base having an annular outlet channel formed on the side thereof enclosing said chamber, said channel encircling said source of radiation within said baffle, a first plate encircling said source of radiation and disposed between said source of radiation and said outlet channel, a second plate encircling said source of radiation and overlying said outlet channel, and projections formed on said first plate at regular intervals therearound and contacting the inner edge of said second plate to space said first and second plates apart, the space between said first and second plates forming an outlet for said chamber communicating with said outlet passage.

13. A water treating apparatus comprising a base, a source of germicidal radiation mounted on said base, a casing mounted on said base, said casing being positioned concentric with respect to said source of radiation and forming a closed chamber in cooperation with said base, an inlet passage in said base communicating with said chamber, a valve seat formed in said inlet passage, a valve member positioned normally between said valve seat and the entrance to said inlet passage and spaced from said seat, and yieldable restraining means holding said valve member away from said seat, said valve member and said valve seat being shaped so that said valve member gradually closes said seat as it is moved toward said seat to restrict flow through said inlet passage.

14. A water treating apparatus comprising a base, a source of germicidal disinfecting radiation mounted on said base, a casing mounted on said base, said casing being positioned concentric with respect to said source of radiation and forming a closed chamber in cooperation with said base, an inlet passage formed in said base and communicating with said chamber, a valve seat formed in said inlet passage, a valve member positioned in said inlet passage between the entrance thereto and said valve seat, yieldable restraining means normally holding said valve member spaced from said valve seat, said valve member and valve seat being shaped so that said valve member gradually closes said seat as said valve member is moved toward said seat gradually to restrict and to reduce flow through said inlet passage, said valve member having an aperture therethrough to permit a minimum predetermined flow therethrough when said valve member is seated upon said valve seat.

15. A water treating apparatus comprising a base, a source of germicidal disinfecting radiation mounted on said base, a casing mounted on said base, said casing being positioned concentric with respect to said source of radiation and forming a closed chamber in cooperation with said base, an inlet passage in said base and communicating with said chamber, a valve seat in said inlet passage, a valve member positioned between said valve seat and the entrance to said inlet passage, a spring supporting said valve member substantially centrally with respect to the diameter of said inlet passage and spaced from said seat, the distance between said valve member and said valve seat being adjustable.

16. A water treating apparatus comprising a base, a source of germicidal disinfecting radiation mounted on said base, a casing mounted on said base, said casing being positioned concentric with respect to said source of radiation and forming a closed chamber in cooperation with said base, an inlet passage in said base communicating with said chamber, and means for automatically restricting the effective flow area of said inlet passage as the pressure in said inlet passage increases, and an outlet for said chamber.

17. A water treating apparatus comprising a base, a source of germicidal disinfecting radiation mounted on said base, a casing mounted on said base, said casing being positioned concentric with respect to said source of radiation and forming a closed chamber in cooperation with said base, an inlet passage in said base, valve means in said inlet passage to close gradually said inlet passage as the pressure at the entrance to said inlet passage increases.

18. A water treating apparatus comprising a base, a source of germicidal disinfecting radiation mounted on said base, a casing mounted on said base, said casing being positioned concentric with respect to said source of radiation and forming a closed chamber in cooperation with said base, an inlet passage in said base, a valve seat in said inlet passage, a ball positioned between said valve seat and the entrance to said inlet passage, a spring holding said ball spaced from the walls of said inlet passage and from said valve seat, the distance between said ball and said valve seat being adjustable.

19. A water treating apparatus comprising a base, a source of germicidal disinfecting radiation mounted on said base, a casing mounted on said base, said casing being positioned concentric with respect to said source of radiation and forming a closed chamber in cooperation with said base, an inlet passage in said base including a portion disposed vertically when the apparatus is in operative position, a valve seat formed in said vertical portion of said inlet passage, a ball positioned between said valve seat and the entrance to said inlet passage in the vertical portion thereof, a spring attached to said ball and holding said ball spaced from the walls of said inlet passage and said seat, the distance between said ball and said seat being adjustable, said ball having an aperture therethrough to permit a predetermined flow of water through said aperture when the ball is seated on said valve seat, and an outlet for said chamber.

20. A water treating apparatus comprising a base, a source of germicidal disinfecting radiation mounted on said base and extending downwardly therefrom in operative position, a casing mounted on said base and extending downwardly therefrom, said casing being positioned concentric with respect to said source of radiation and forming a closed chamber in cooperation with said base, said casing including a readily breakable portion, and an inlet and an outlet for said chamber, said base having a venting passage formed therein communicating with said chamber and extending upwardly from said chamber to provide escape for water from said chamber when the pressure therein rises to a predetermined maximum.

21. A water treating apparatus comprising a base, a source of germicidal disinfecting radiation mounted on said base and including exposed electrical connections therefor, a plug and a receptacle for supplying electrical potentials to said electrical connections, a removable cover mounted on said base and covering said exposed electrical connections, one of said plug and receptacle being mounted on said base so that electrical potentials are removed from said exposed electrical connections when said cover is removed, a casing mounted on said base, said casing being positioned around said source of radiation and forming a closed chamber in cooperation with said base, and an inlet and an outlet for said chamber.

References Cited in the file of this patent

UNITED STATES PATENTS

| | | |
|---|---|---|
| 2,484,615 | Downs | Oct. 11, 1949 |
| 2,537,774 | Machinist | Jan. 9, 1951 |
| 2,616,646 | Matthysse | Nov. 4, 1952 |
| 2,648,774 | Whitlock | Aug. 11, 1953 |
| 2,669,661 | Riddiford et al. | Feb. 16, 1954 |
| 2,670,439 | Darney | Feb. 23, 1954 |